Patented Aug. 6, 1946

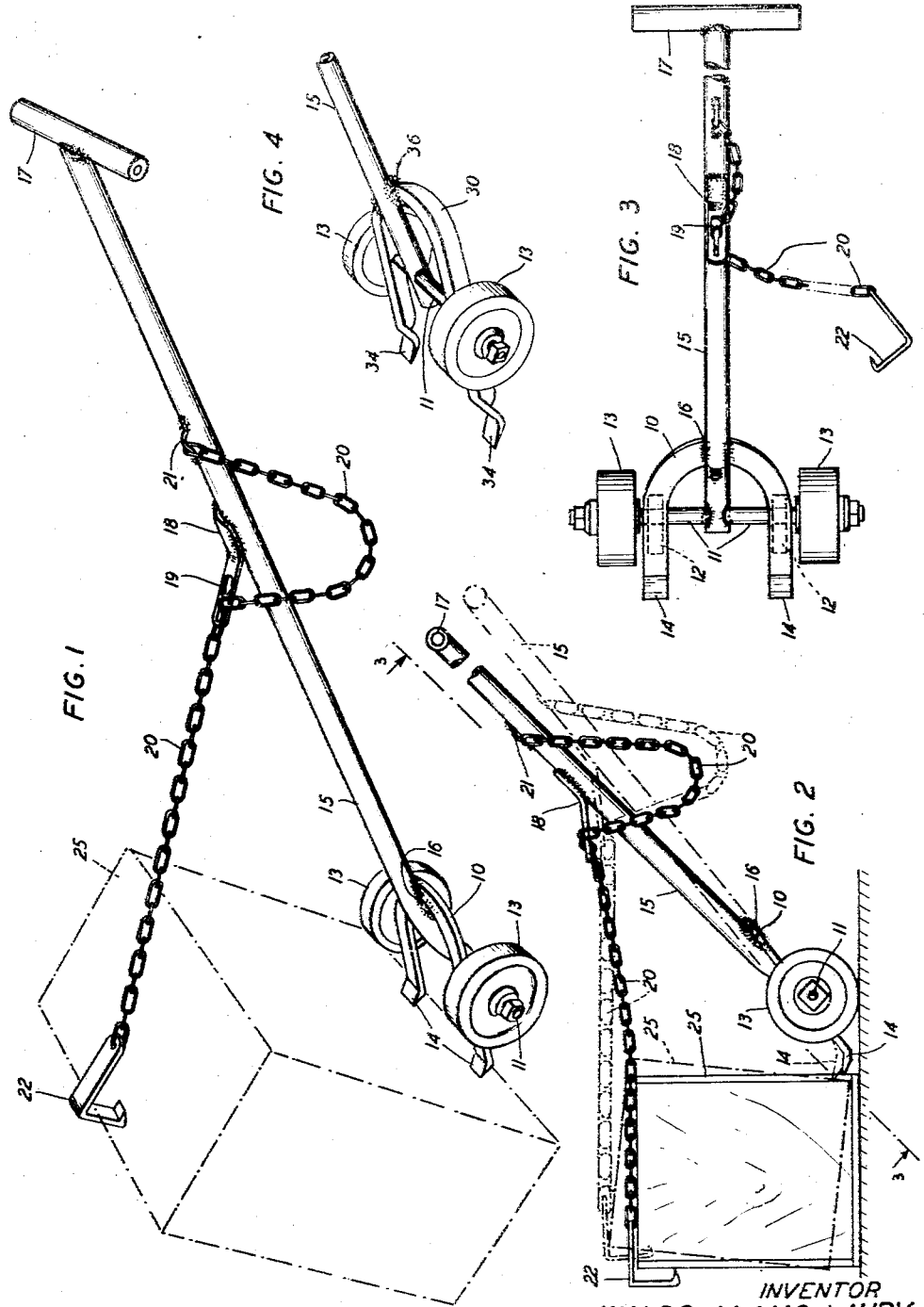

2,405,155

UNITED STATES PATENT OFFICE 2,405,155

HAND TRUCK

Waldo M. MacLaury, Cold Spring Harbor, N. Y.

Application September 23, 1944, Serial No. 555,464

1 Claim. (Cl. 214—65.4)

This invention relates to hand trucks for transporting boxes, packages and the like.

An object of the invention is to provide a hand truck for handling heavy articles.

A further object of the invention is to provide a hand truck with which articles can be transported without any direct lifting action on the part of the operator.

With the conventional hand or baggage truck not only must the article to be handled be at least partly lifted in order to load it onto the truck but also during the act of transportation the operator must support a portion of the load. As a result the transportation of heavy articles cannot be carried out by a single operator. Even with articles of medium weight this requires the exercise of considerable lifting effort which is both very tiring and conducive to injury to the operator.

In accordance with applicant's invention the truck is formed of a frame member provided with article-gripping claws at its lower end and supported on a wheeled axle at an intermediate point. Another article-gripping claw or hook is adjustably attached to the frame member by a chain or other tension member at a point between the axle fulcrum point and the handle. In the use of the truck the article is gripped between the claws on the lower end of the frame member and the hook on the tension member with the frame member in such a position that the article is lifted solely by the downward force exerted by the operator. Also in transporting the article, the operator exerts only a downward force. No lifting action is required.

These and other objects, features and aspects of the invention may be better understood by reference to the following detailed description in connection with the drawing in which:

Fig. 1 is a perspective view of one embodiment of the invention;

Fig. 2 is a side elevation of the hand truck of Fig. 1;

Fig. 3 is a view taken along the line 3—3 of Fig. 2; and

Fig. 4 is a partial perspective view of a second embodiment of the invention.

Referring first to the embodiment shown in Figs. 1 to 3: The main frame of the truck is formed of a yoke-shaped member 10 and a lever member 15. The yoke 10 is formed of strap iron bent into the shape shown and the lever member 15, of steel tubing which is welded to the yoke 10 at the point 16. An axle 11 is carried by two bearing blocks 12 welded to the underside of the arms of the yoke member 10 and extends through a hole near the lower end of the lever member 15. Two wheels 13 are carried on the outer ends of the axle 11. The forward projecting ends 14 of the yoke 10 are bent at an angle to the rest of the member and sharpened to form claws for gripping the load. A handle 17 is welded to the lever member 15 at its upper end.

A bracket 18 having a keyhole-shaped opening 19 is welded to the lever member 15 at an intermediate point thereon. A chain 20 is threaded through the hole 19 and has one end secured to the lever member 15 by means of the ring 21 welded thereto. The bracket 18 may be provided with a hook for engaging the chain instead of the hole 19. A hook 22 is fastened to the free end of the chain 20.

In order to illustrate the operation of the truck a box 25 to be lifted and moved is shown in Figs. 1 and 2. In the operation of the truck it is wheeled up to the load until the claws 14 come in contact with the near side thereof. The hook 22 is then placed over the box 25 so that its claw edge contacts the opposite side thereof and the chain 20 is adjusted in the hole 19 so that its slack is largely taken up. Then by applying a downward force on the handle 17 the box 25 is gripped between the claws 14 and the hook 22 and lifted. This is illustrated by the dotted line view of Fig. 2. In transporting the load the truck is wheeled and the load is carried solely by the maintenance of a downward force on the handle 17. No lifting action on the part of the operator is ever required in order to support the load.

In the modified form of the invention shown in Fig. 4 the yoke member 30 is formed of strap iron bent on edge. Holes are bored directly through the member 30 to carry the axle 11. The load-engaging claws are formed by twisting and sharpening the ends of the yoke member 30. In other respects the modification of Fig. 4 is identical to that of the other figures. As in that form, the lever member 15 is supported at its lower end by the axle 11 and welded to the yoke member 30 at their point of contact 36.

For the embodiment shown in Fig. 4 the shoulders formed by twisting the ends of the yoke member 30 to form the claws 34 will prevent the load from binding on the wheels 13 if the claws 34 slip under the load.

The embodiments of the invention illustrated herein are particularly adapted for use with heavy loads and various modifications may be made where such strength is not required or for other purposes. For example, a cable may be used in place of the chain 20. These and other modifications may be made without departing from the true spirit and scope of the invention as defined in the appended claim.

What is claimed is:

A hand truck comprising an elongated frame including a lever member having a handle at one end, a yoke shaped member formed of a bent metal strip attached to said lever member near the other end thereof with the ends of said yoke member extending in the same direction as said other end of said lever member, an axle mounted in holes intermediate the ends of the leg portions of said yoke member, supporting wheels on said axle, load gripping, twisted claws on the free ends of said yoke member, a load gripping hook, a flexible member having one end attached to said hook, and means for adjustably attaching said flexible member to said lever member to grip and lift the load between said hook and said claws when downward pressure is applied to said lever member at said handle.

WALDO M. MacLAURY.